(12) United States Patent
Jacob et al.

(10) Patent No.: US 8,096,888 B2
(45) Date of Patent: Jan. 17, 2012

(54) OPPOSED PATH JOINT

(75) Inventors: Werner Jacob, Frankfurt am Main (DE); Martin D. Jacob, Braunschweig (DE)

(73) Assignee: Shaft-Form-Engineering GmbH, Hausach (DE)

( * ) Notice: Subject to any disclaimer, the term of this patent is extended or adjusted under 35 U.S.C. 154(b) by 0 days.

(21) Appl. No.: 12/590,314

(22) Filed: Nov. 5, 2009

(65) Prior Publication Data

US 2010/0069165 A1  Mar. 18, 2010

Related U.S. Application Data

(60) Division of application No. 12/154,136, filed on May 20, 2008, now Pat. No. 7,637,818, which is a continuation of application No. 10/506,257, filed as application No. PCT/EP03/02318 on Mar. 6, 2003, now Pat. No. 7,396,284.

(30) Foreign Application Priority Data

Mar. 7, 2002 (DE) .................................. 102 09 933
Mar. 7, 2002 (DE) .................................. 102 12 540

(51) Int. Cl.
*F16D 3/224* (2006.01)
(52) U.S. Cl. ........................................ 464/145; 464/906
(58) Field of Classification Search .................. 464/140, 464/145, 906
See application file for complete search history.

(56) References Cited

U.S. PATENT DOCUMENTS

| 1,916,442 | A | 7/1933 | Rzeppa |
| 3,664,152 | A | 5/1972 | Macielinski |
| 4,968,287 | A | 11/1990 | Jacob |
| 5,221,233 | A | 6/1993 | Jacob |
| 5,242,329 | A | 9/1993 | Jacob |
| 5,433,668 | A | 7/1995 | Harz et al. |
| 5,593,084 | A | 1/1997 | Harz et al. |
| 5,599,234 | A | 2/1997 | Harz et al. |
| 6,261,184 | B1 | 7/2001 | Jacob et al. |
| 6,270,419 | B1 | 8/2001 | Jacob |
| 6,280,336 | B1 | 8/2001 | Sone et al. |
| 6,848,999 | B2 | 2/2005 | Weckerling et al. |

FOREIGN PATENT DOCUMENTS

| DE | 18 31 826 | 5/1961 |
| DE | 19 41 130 | 6/1966 |
| DE | 40 31 819 | 3/1992 |
| DE | 40 31 820 | 4/1992 |
| DE | 44 03 591 | 4/1995 |
| DE | 43 27 990 | 6/1995 |
| DE | 197 03 696 | 8/1997 |
| DE | 198 31 012 | 1/2000 |
| DE | 199 05 451 | 9/2000 |
| DE | 100 60 118 | 12/2000 |
| DE | 199 63 617 | 12/2001 |
| DE | 102 09 933 | 10/2003 |
| FR | 2 689 586 | 4/1993 |
| GB | 2 347 730 | 9/2000 |
| JP | 2000-346087 | 12/2000 |
| KR | 2000-0011624 | 2/2000 |

*Primary Examiner* — Gregory Binda
(74) *Attorney, Agent, or Firm* — Collard & Roe, P.C.

(57) ABSTRACT

An opposed path joint including an inner hub, which is provided with first and second inner grooves, and an outer hub, which is provided with first outer grooves and second outer grooves that respectively form a pair with the first and second inner grooves. The opposed path joint also includes a ring-shaped cage, which is placed between the inner hub and the outer hub and which has radial openings whose number corresponds to that of the groove pairs. Balls that engage inside the grooves are guided inside these radial openings. The outer hub of the opposed path joint has at least two elements that are located one behind the other on the outer hub axis and jointly center the cage.

10 Claims, 8 Drawing Sheets

OPPOSED PATH JOINT

CROSS REFERENCE TO RELATED APPLICATIONS

This application is a division and claims priority under 35 U.S.C. §§120 and 121 of U.S. patent application Ser. No. 12/154,136 filed May 20, 2008 now U.S. Pat. No. 7,637,818 which in turn is a continuation and claims priority under 35 U.S.C. §120 of U.S. patent application Ser. No. 10/506,257 filed Aug. 31, 2004 now U.S. Pat. No. 7,396,284. Applicants claim priority under 35U.S.C. §365 of PCT/EP03/02318 filed on Mar. 6, 2003, which claims priority under 35 U.S.C. §119 of German Application No. 102 09 933.2 filed on Mar. 7, 2002 and German Application No. 102 12 540.6 also filed on Mar. 7, 2002. The international application under PCT article 21 (2) was not published in English.

BACKGROUND OF THE INVENTION

1. Field of the Invention

The invention relates to an opposed path joint that has a drive side and a power take-off side, having an inner hub, an outer hub, and a ring-shaped cage having a spherical outer surface, which cage is arranged between the inner hub and the outer hub and has several radial openings, in which balls are guided. The inner hub has an inner hub axis and an outer surface, in which first inner grooves and second inner grooves are arranged, alternately distributed about the inner hub axis. In this connection, the first inner grooves run from the drive-side end, proceeding in the direction towards the power-take-off-side end, whereby their track base moves away from the inner hub axis. The second inner grooves run from the power-take-off-side end, proceeding in the direction towards the drive-side end, whereby their track base moves away from the inner hub axis. The outer hub has an outer hub axis and an inner surface in which first outer grooves and second outer grooves are arranged, alternately distributed about the outer hub axis. In this connection, the first inner grooves lie opposite first outer grooves, and the second inner grooves lie opposite second outer grooves, and form a pair with them, in each instance. The first outer grooves run from the drive-side end, proceeding in the direction towards the power-take-off-side end, whereby their track base comes closer to the outer hub axis. The second outer grooves run from the power-take-off-side end, proceeding in the direction towards the drive-side end, whereby their track base comes closer to the outer hub axis.

2. The Prior Art

Such joints are used, among other things, in longitudinal shafts or lateral shafts or in steering shafts of motor vehicles. A same path joint is known from DE 199 05 451 C2, the outer hub of which is produced from a flat sheet-metal part, which is bent to form an open ring or ring segments after the outer grooves have been formed in it, and which is held in a closed ring-shaped accommodation part during operation. By means of the formation of the outer grooves in the sheet-metal part, cavities are formed between the latter and the accommodation part. In certain load cases, depending on the elasticity of the sheet-metal parts, deformations in the outer hub can occur, which exceed the permissible tolerances. In addition, in this known same path joint, the balls must be inserted individually into the cage and the pairs of grooves. This assembly step, which is performed manually, is time-consuming.

SUMMARY OF THE INVENTION

The invention is therefore based on the task of making available an opposed path joint of the type stated initially, which can also withstand great stress, such as it occurs in the case of changes in load in the drive train, for example, and is suitable for mass production, with uniformly high production precision, and which is simpler and faster to install.

This task is accomplished, according to the invention, in that the outer hub is a single-piece closed ring, in which the outer grooves are formed without cutting. In this configuration of the opposed path joint, the outer hub is a solid ring, closed over the entire circumference, which consequently can absorb high forces. The outer grooves are made in the ring by means of deformation technology, i.e. by means of hot forming, stamping, or hammering, for example. Of course, cutting machining of the ring can also be required between or after the deformation steps, for example for de-burring, but forming of the outer grooves takes place without cutting. In this connection, stress relief grooves that run on the inside surface and/or between the outer grooves of the outer hub serve to accommodate material that is displaced during the stamping process, for example. By means of deformation technology, it is possible to produce the outer ring with a uniformly high quality and precision, so that the redundancy of the opposed path joint as a consequence of dividing errors can be reduced, by means of the great accuracy of the outer grooves made in the outer hub. The production of the outer hub as a solid deformed part is furthermore possible with great efficiency in large-scale production.

According to a preferred embodiment of the invention, the cage is guided to be centered in the outer hub. This can be achieved, in particular, in that first cage centering surfaces and second centering surfaces that are adjacent to one another in pairs are formed in the inner surface of the outer hub, between the outer grooves. In this connection, the first cage centering surfaces are adjacent to the first outer grooves, in each instance, while the second cage centering surfaces are adjacent to the second outer grooves. The first cage centering surfaces run from the drive-side end, proceeding in the direction towards the power-take-off side end, and in this connection, their track base comes closer to the outer hub axis. Accordingly, the second cage centering surfaces run from the power-take-off-side end, proceeding from the drive-side end, and their track base comes closer to the outer hub axis, in this connection. In this manner, it is possible that the cage is guided in the outer hub, whereby the first and the second cage centering surfaces alternately guide the cage in the axial direction. Therefore the outer hub takes over centering of the cage with the balls guided in it, at the same time. The inside of the cage therefore does not have to have a contour suitable for guiding it, but instead can be configured cylindrically, for example. The production costs of the cage can be minimized in this way.

Introduction of the cage into the outer hub can take place in particularly simple manner if the number of grooves of the outer hub is a whole-number multiple of four. In this configuration of the outer hub, it is ensured that in the case of outer grooves that are uniformly distributed over the circumference, first outer grooves always lie opposite first outer grooves, and second outer grooves always lie opposite second outer grooves. This means that two outer grooves that lie diametrically opposite one another will always lie at the same end of the outer hub with their larger opening, i.e. the side in which the track base in the outer grooves lies farthest from the outer hub axis. The cage that has a spherical surface can now be introduced into the outer hub, if the longitudinal axis of the cage stands essentially at a right angle to the outer hub axis. For this purpose, it is necessary that the cage centering surfaces alternately have an inside diameter that corresponds at least to the greatest outside diameter of the cage, up to the center of the outer hub, and that this diameter only decreases starting from the center of the outer hub, up to the edge of the inside diameter of the outer hub, corresponding to the contour of the outer surface of the cage. As soon as the cage has been introduced into the alignment with the outer hub as described above, far enough into the latter so that the diameter line of the cage coincides with the center line of the outer hub, the cage can be freely pivoted in the outer hub. For assembly of the opposed path joint, after the cage has been introduced into the outer hub in a position in which the axes of the cage and of the outer hub are essentially perpendicular to one another, the cage is rotated into a position in which the axes of the cage and of the outer hub essentially cover one another, i.e. the cage and the outer hub lie in the same plane. In this position of the cage, it is guided by the alternate cage centering surfaces of the outer hub, in the axial direction, but can rotate about its axis, relative to the outer hub.

In a further development of the idea of the invention, the outer hub is surrounded by an accommodation part, so as to rotate with it, at least in certain regions, which part has a stud that is slit longitudinally, having a connecting bore, which carries an attachment shackle. In this way, the outer hub can be connected with a driving or driven component, so as to rotate with it.

If a sealing disk is provided in the accommodation part, between the stud and the outer hub, the penetration of dirt into the joint can be prevented, on the one hand, and at the same time, a lubricant reservoir can be formed in the joint itself, so that sufficient lubrication is assured during the entire lifetime of the opposed path joint.

As an alternative to this, however, it is also possible that the outer hub carries a connecting flange on its outer circumference, in order to be connected with a driving or driven component.

As an alternative to the embodiments described above, the task on which the invention is based is also accomplished in that the outer hub comprises at least two elements that are connected with one another, which lie behind one another on the outer hub axis and jointly center the cage. With this structure of the opposed path joint, the cage is guided by the elements of the outer hub, so that the inner surface of the cage does not have to be specially configured for guiding the cage, but instead can be configured cylindrically, for example. The inner hub can consequently be inserted directly into the cage. In this manner, it is possible to introduce the cage, in which at least every other ball is inserted, into one of the elements of the outer hub, and subsequently to connect the second element of the outer hub with the element that contains the cage. Manual, individual insertion of each ball into the cage is therefore eliminated at least for every other ball. Assembly of the opposed path joint can therefore take place more quickly and simply.

According to one embodiment of the invention, the outer hub comprises two solid rings that are connected with one another. These can absorb great forces in the radial direction and the circumference direction, so that the ability of the outer hub to withstand stress is not impaired by its division into two elements.

Automatic assembly of the balls is made possible if the two rings of the outer hub engage into one another, whereby one of the rings has the first outer grooves and the second ring has the second outer grooves. In this way, the cage can be set onto the inner hub, whereby the balls can be introduced into the cage and onto the inner hub through the openings, in automated manner. To finish the joint, the two rings of the outer hub are merely set onto the cage, with the balls, from axially opposite directions, and connected with one another. In this connection, the large openings of the outer grooves point in the direction of the setting-on movement, so that the balls can be accommodated in them.

As an alternative or in addition to this, it is possible to provide a profiled disk at least one end of an outer hub part, which disk rests on the outer cage surface, centering the cage, in certain regions. In this manner, the cage itself can be inserted directly into the outer hub part that forms the outer hub, together with the disk, and subsequently held centered in the outer hub part, by means of the attachment of the profiled disk to the outer hub part. At the same time, it is possible to introduce at least half the balls already together with the cage, inserted in its window, into the outer hub part.

In accordance with another embodiment of the invention, profiled disks are provided both at the drive-side end and at the power-take-off-side end of the outer hub part, which disks rest on the outer cage surface, centering the cage, in certain regions. This embodiment is particularly suitable for the use of an outer hub that carries an outer flange for connecting a driving or driven component, to which the two profiled, perforated disks can be attached.

Preferably, the at least one profiled disk has a contact region with which it can be brought into engagement with the outer hub part, in order to position it relative to the latter. In this manner, the cage is centered indirectly, by way of the at least one perforated disk.

As an alternative to this, the at least one profiled disk can be provided with a contact region with which it rests against an accommodation flange attached to the outer hub part, in order to position it relative to the outer hub part. In this embodiment, the at least one profiled disk is held on the outer hub part by way of a metal attachment sheet, and centered relative to the outer hub part by means of this sheet. In this way, the cage is centered in the outer hub part by way of the at least one disk and the accommodation flange, in this embodiment, as well. To transfer a torque from the outer hub to the accommodation flange, it is necessary that the latter be connected with the outer hub part so as to rotate with it. This can take place, for example, by means of cams that engage in corresponding recesses on the outer circumference of the outer hub part.

In a further development of the idea of the invention, it is provided that the at least one disk has bulges that project away from the outer hub part, corresponding to the number of outer grooves, which are in connection with one of the outer grooves, in each instance, forming a cavity. In this embodiment, the at least one profiled disk serves, at the same time, to guide the balls of the cage in the axial direction. In the cavity that is formed by the bulges of the at least one profiled disk, a lubricant reservoir can be provided in the opposed path joint itself, whereby the lubricant is pressed into the lubricant reservoir by means of centrifugal force, during operation of the opposed path joint.

In accordance with the use of the opposed path joint, the profiled disks can be configured either as perforated disks or as closed cage guide covers, whereby perforated disks permit passing a driving or driven shaft through the opening in the disk. Penetration of dirt into the joint can be prevented by means of a closed cage guide cover.

BRIEF DESCRIPTION OF THE DRAWINGS

In the following, the invention will be explained in greater detail, using exemplary embodiments, making reference to the drawing.

This shows.

DETAILED DESCRIPTION OF PREFERRED EMBODIMENTS

Figure 1:
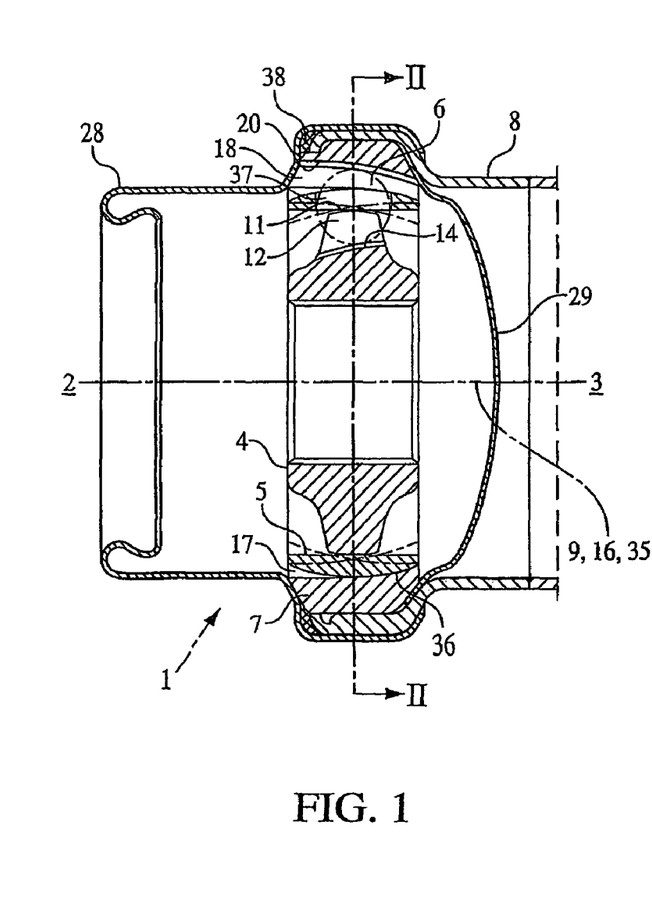
FIG. 1 a longitudinal cross-section through an opposed path joint according to the invention, FIG. 2 a cross-section through the opposed path joint according to FIG. 1, along the line II-II, FIG. 3 a longitudinal cross-section through the outer hub of FIG. 1 during insertion of the cage, FIG. 4 a side view of the outer hub according to FIG. 3, during insertion of the cage, FIG. 5 a side view of an outer hub according to another embodiment, FIG. 6 a longitudinal cross-section through an opposed path joint having an outer hub according to FIG. 5, FIG. 7 a longitudinal cross-section through an opposed path joint according to another embodiment, FIG. 8 a cross-sectional view of the outer hub according to FIG. 7, with the accommodation part, FIG. 9 a cross-sectional view along the line IX-IX in FIG. 7, FIG. 10 a cross-sectional view along the line X-X in FIG. 8, FIG. 11 as a detail, a side view of an outer hub according to another embodiment, FIG. 12 a cross-section through the outer hub according to FIG. 11, along the line XII-XII, FIG. 13 a cross-section through the outer hub according to FIG. 11, along the line XIII-XIII, with the inner hub inserted, FIG. 14 a cross-section through an opposed path joint according to another embodiment, FIG. 15 a side view of an outer hub according to another embodiment, FIG. 16 a cross-section through the outer hub according to FIG. 15, along the line XVI-XVI, with the inner hub inserted, FIG. 17 a cross-section through the outer hub of FIG. 16, along the line XVII-XVII, FIG. 18 a partial cross-sectional view of an outer hub according to another embodiment, and FIG. 19 a cross-section through the outer hub according to FIG. 18 along the line XIX-XIX, with the inner hub inserted.

A first embodiment of an opposed path joint 1 is shown in FIG. 1 to 4. In FIG. 1, a drive-side end 2 and a power-take-off-side end 3 is indicated, whereby the designations "drive-side end" and "power-take-off-side end" were selected in the following description purely as an example, for a better differentiation of the two ends. Of course both ends 2, 3 are suitable for being connected with a driving component or a power take-off component.

From the inside to the outside, the opposing path joint 1 has an inner hub 4, a cage 5, in which balls 6 are guided, an outer hub 7, and an accommodation part 8.

The inner hub 4 is a ring-shaped component having a central inner hub axis 9 and a profiled inner surface 10 for a connection with a driving component or a driven component. The outer surface 11 of the inner hub 4 has several first inner grooves 12 and second inner grooves 13, arranged on the circumference, regularly and alternately distributed.

The first inner grooves run, without an undercut, from the drive-side end 2, proceeding in the direction towards the power-take-off-side end 3. In this connection, their track base 14 moves away from the inner hub axis 9. The second inner grooves 13 run, without an undercut, from the power-take-off-side end 3, proceeding in the direction towards the drive-side end 2, whereby their track base 15 moves away from the inner hub axis 9, in this connection.

Figure 2:
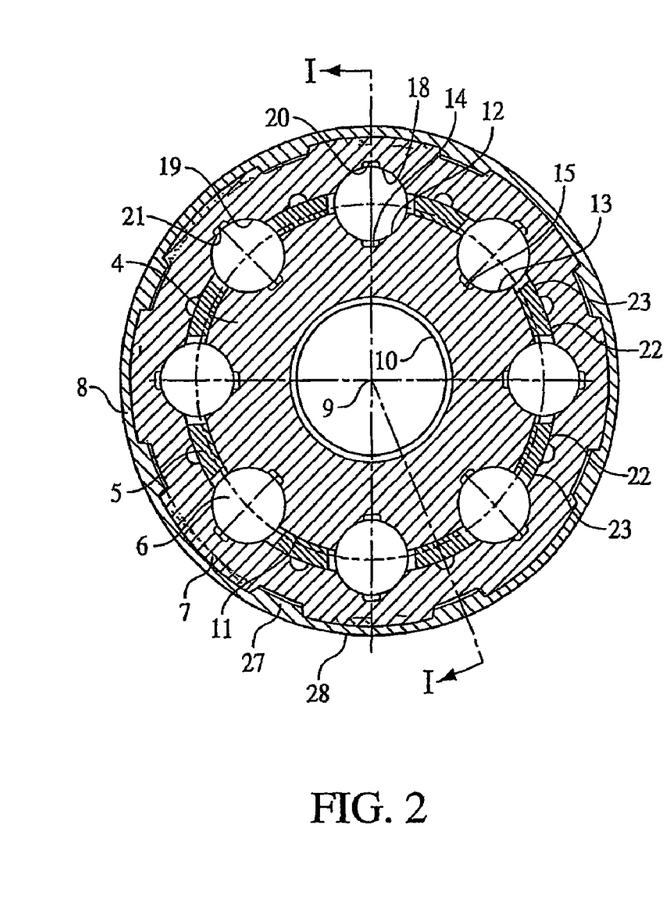
Figure 7:
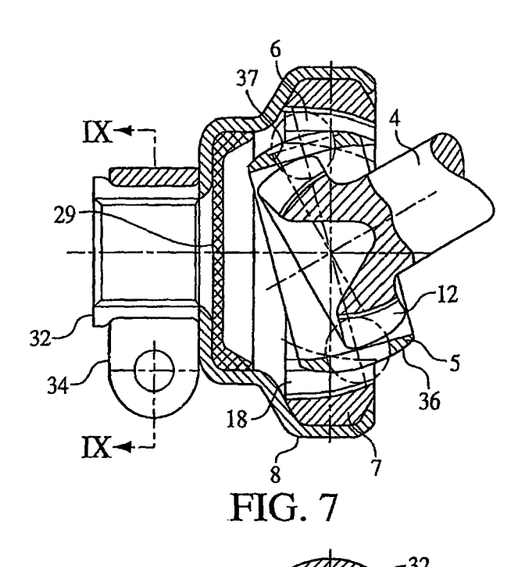
Figure 8:
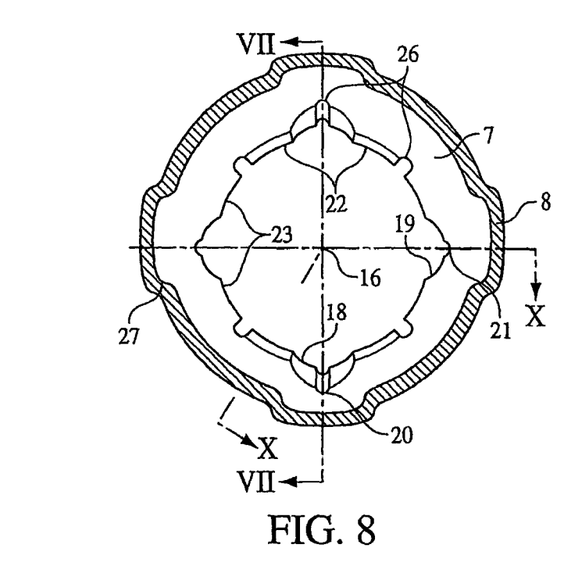
Figure 9:
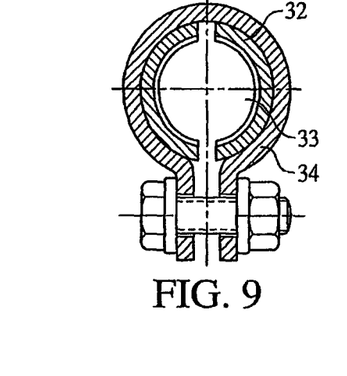

The outer hub 7 is a single-piece, ring-shaped component having an outer hub axis 16, which coincides with the inner hub axis 9 of the inner hub 4 in the extended position of the opposed path joint according to FIG. 1. The inner surface 17 of the outer hub 7 has first outer grooves 18 and second outer grooves 19, which are arranged distributed regularly and alternately about the outer hub axis 16. As shown in FIG. 2, in the finished, assembled state of the opposed path joint 1, first inner grooves 12 of the inner hub 4 lie opposite first outer grooves 18 of the outer hub 7, and second inner grooves 13 lie opposite the second outer grooves 19, and form a pair with these, in each instance. In the embodiments shown in FIG. 1 to 6, eight pairs of grooves are formed in the inner hub 4 and the outer hub 7, in each instance. The number of groove pairs can, however, also be another whole-number multiple of four, as shown in FIGS. 7 and 8, for example.

The first outer grooves 18 of the outer hub 7 run, without an undercut, from the drive-side end 2, proceeding in the direction towards the power-take-off-side end 3, whereby their track base 20 comes closer to the outer hub axis 16, in this connection. The second outer grooves 19 run, without an undercut, from the power-take-off-side end 3, proceeding in the direction towards the drive-side end 2, whereby their track base 21 comes closer to the outer hub axis 16, in this connection.

First cage centering surfaces 22 and second cage centering surfaces 23 are formed between the outer grooves 18, 19, in the inner surface 17 of the outer hub 7, in pairs, adjacent to one another. The first cage centering surfaces 22 are adjacent to the first outer grooves 18, in each instance, while the second cage centering surfaces 23 are adjacent to the second outer grooves 19. In this connection, the first cage centering surfaces 22 run, without an undercut, from the drive-side end 2, proceeding in the direction towards the power-take-off-side end 3, and come closer to the outer hub axis 16. The second cage centering surfaces 23 also run, without an undercut, from the power-take-off-side end 3, proceeding in the direction towards the drive-side end 2, and come closer to the outer hub axis 16, in this connection. In other words, the inside diameter $D_A$ of the outer hub 7 decreases in two cage centering surfaces that lie opposite one another, from one end to the opposite end. In this connection, the inside diameter $D_A$ of the outer hub 7 is at least as great, in the region between the drive-side end 2 and the center of the outer hub 7 for the first cage centering surfaces 22, or between the power-take-off-side end 3 and the center of the outer hub 7 for the second cage centering surfaces 23, as the outside diameter $D_K$ of the cage 5. In the region between the center of the outer hub 7 and the power-take-off-side end 3 for the first cage centering surfaces 22, or between the center of the outer hub 7 and the drive-side end 2 for the second cage centering surfaces 23, these are adapted to the outer contour of the cage 5.

Stress-relief grooves 26 that can accommodate material that is displaced during the non-cutting production of the outer grooves 18, 19, by means of deformation, for example by means of stamping or hammering, run between the outer grooves 18, 19 of the outer hub 7 and between the cage centering surfaces 22, 23, in each instance.

In the exemplary embodiment shown in FIGS. 1 and 2, the outer hub 7 is surrounded by an accommodation part 8 in the form of a weld-on flange made of sheet metal. The accommodation part 8 is connected to rotate with the outer hub 7, by means of projections 27 that engage in corresponding recesses of the outer hub 7. On the drive-side end 2, a cap 28 that partly surrounds the accommodation part 8 is shown, which serves to attach a folded bellows, not shown, to seal the opposed path joint. On the power-take-off-side end 3 of the opposed path joint 1, a sealing disk 29 is provided in the accommodation part 8, which seals the opposed path joint 1. The cavity formed by the sealing disk 29 can furthermore be used as a lubricant reservoir for the opposed path joint 1.

Figure 5:
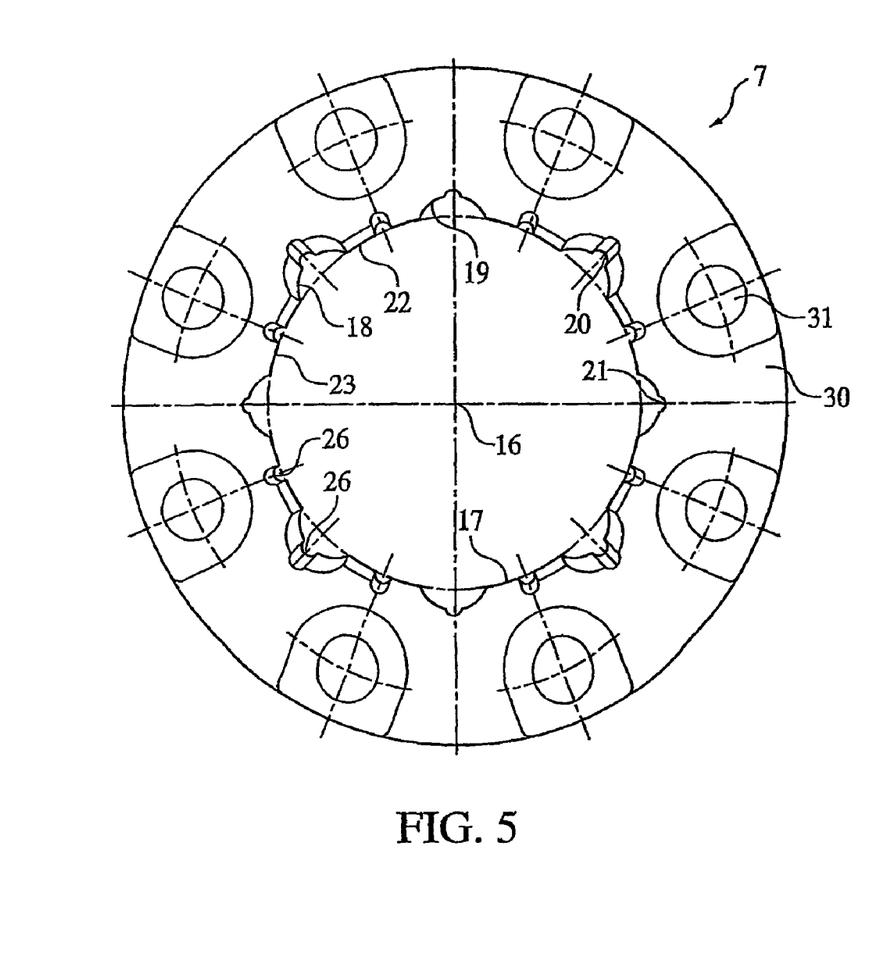
Figure 6:
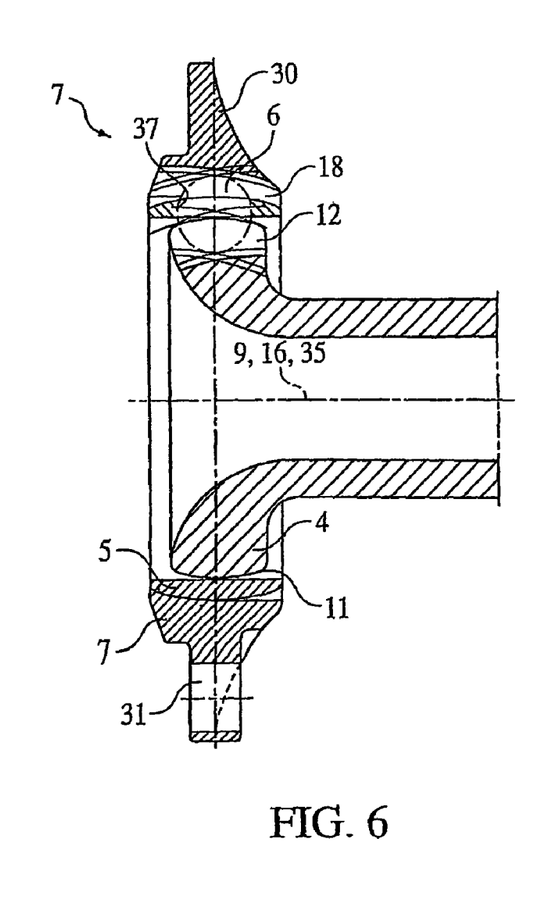

In FIGS. 5 and 6, another embodiment of the opposed path joint 1 is shown, whereby the same components are designated with the same reference numbers. The outer hub 7 of the opposed path joint 1, in contrast to the embodiment shown in FIGS. 1 and 2, is not surrounded by an accommodation part 8, but rather carries a connecting flange 30. Several passage bores 31 are provided in the connecting flange 30, in order to connect the outer hub 7 with a driving or driven component.

Furthermore, in FIG. 6, the inner hub is configured not as a ring-shaped component having an inner gearing 10, but rather as a hollow shaft, in the outside surface 11 of which the inner grooves 12, 13 are arranged.

In FIG. 7 to 10, an embodiment of the opposed path joint 1 is shown that can be used as a same path joint, for example. The same components are designated with the same reference numbers.

In this embodiment, the inner hub 4 is configured as a shaft, on the outer surface 11 of which first inner grooves 12 and second inner grooves 13 are arranged. The outer hub 7 is surrounded by an accommodation part 8 and connected with it so as to rotate with it. The accommodation part 8 has a stud 32 that is slit longitudinally, having a connecting bore 33. The stud 32 furthermore carries an attachment shackle 34. As is best evident from the illustration of FIG. 8, the opposed path joint 1 according to this embodiment has two first outer grooves 18 and two second outer grooves 19, i.e. a total of four grooves.

Figure 10:
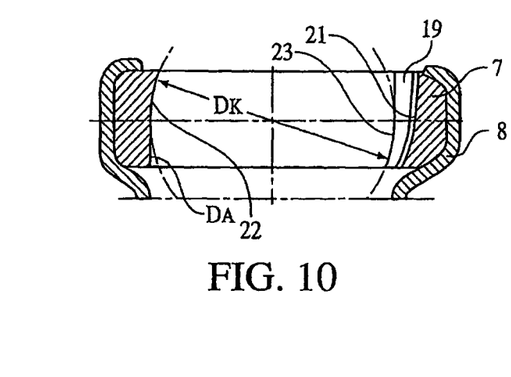

In the following, assembly of an opposed path joint will now be explained, making reference to FIGS. 3, 4, and 10.

First, the cage 5 is inserted into the outer hub 7. For this purpose, the cage 5 is pivoted in such a manner that its axis 35 stands essentially perpendicular to the outer hub axis 16. As is best evident from FIG. 4, the cage 5 has a spherical outer surface 36, i.e. the cage 5 corresponds to a disk cut out of a sphere, having a cylindrical passage.

The cage centering surfaces 22 and 23, respectively, have a contour, at least in their region that comes close to the outer hub axis 16, between the center of the outer hub 7 and one end 3 or 2, which is configured like a segment of an arc. In this connection, the outside diameter $D_K$ of the cage 5 is less than or equal to the inside diameter $D_A$ in the center of the outer hub 7.

Figure 3:
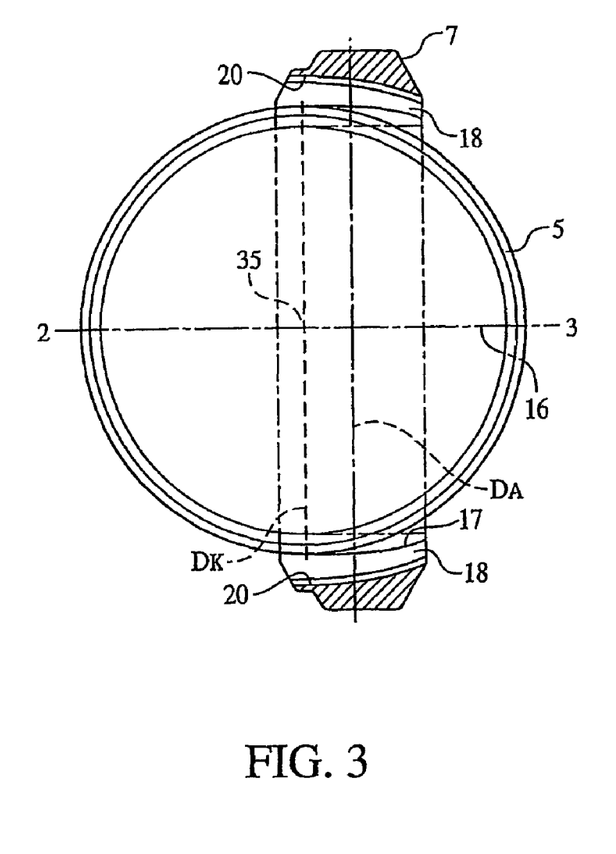
Figure 4:
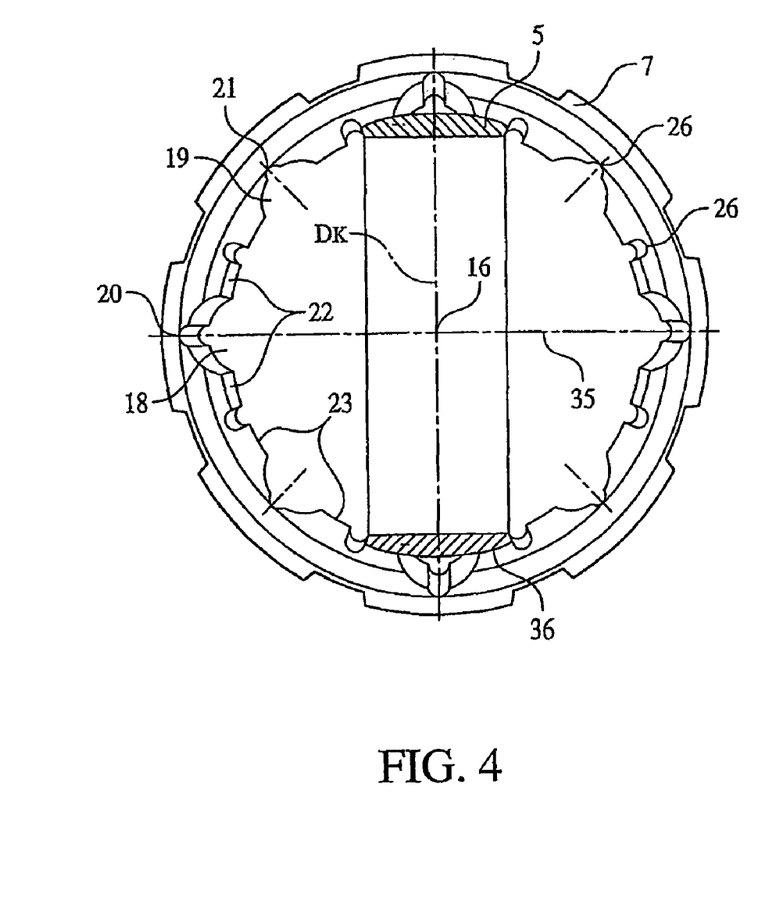

Therefore the cage 5 can be introduced into the outer hub 7, guided by cage centering surfaces that lie opposite one another, in its alignment relative to the outer hub 7 that is shown in FIGS. 3 and 4, until the cage 5 makes contact with the region of the cage centering surfaces, which comes so close to the outer hub axis 16 that the inside diameter of the outer hub 7 in this region is less than the outside diameter of the cage 5. In this position, the axes defined by the outside diameter $D_K$ of the cage 5 and the inside diameter $D_A$ in the center of the outer hub 7 lie on top of one another, covering one another.

In this position, the cage 5 can be pivoted into the outer hub 7, until the axis 35 of the cage 5 and the outer hub axis 16 lie on top of one another, covering one another, as shown, for example, in FIG. 1. As is evident from FIG. 10, the cage 5, indicated by its outside diameter $D_K$, can be freely rotated or pivoted in the outer hub 7, whereby it is guided in the outer hub 7 by the cage centering surfaces 22, 23. By means of the region of the cage centering surfaces 22, 23 that come close to the outer hub axis 16, it is furthermore prevented that the cage 5 can be moved in the axial direction, relative to the outer hub 7, as long as the axis 35 of the cage 5 is not pivoted too far towards the outer hub axis 16.

It is evident that insertion of the cage 5 into the outer hub 7 in the manner as described above can only take place if two first outer grooves 18 having first cage centering surfaces 22, or outer grooves 19 having second cage centering surfaces 23, respectively, lie diametrically opposite one another in the outer hub 7. This is only achieved, in the case of outer grooves 18, 19 that are uniformly distributed over the circumference, if the number of outer grooves 18, 19 is a whole-number multiple of four.

When the cage 5 has been inserted into the outer hub 7, and the axis 35 of the cage is aligned to cover the outer hub axis 16, the inner hub 4 can be inserted into the cage 5. The inner contour of the cage 5 is cylindrical, as can be seen in FIG. 4, and has an inside diameter that is greater than or equal to the greatest outside diameter of the inner hub 4. The inner hub 4 can therefore be inserted into the cage 5. In this connection, the inner hub 4 is aligned in such a manner, relative to the outer hub 7, that first inner grooves 12 lie opposite first outer grooves 18, and second inner grooves 13 lie opposite second outer grooves 19, and form groove pairs 12, 18; 13, 19.

In accordance with the number of groove pairs 12, 18; 13, 19, radial openings 37 are arranged in the cage 5. In order to insert the balls 6 into the openings 37 of the cage 5, the cage 5, with the inner hub 4, is pivoted relative to the outer hub 7 on the side of the outer grooves on which the track base 20 or 21, respectively, of the outer grooves 18 or 19, respectively, has its greatest distance from the outer hub axis 16. In other words, an opening 37 of the cage 5 is pivoted out of the outer hub 7, in each instance, until it comes out of the latter, on the side of the largest opening of the groove pairs 12, 18 or 13, 19, respectively. A ball 6 can now be inserted into the opening 37 of the cage 5 that has been pivoted out in this manner. This procedure must be carried out individually for each ball 6, i.e. for each groove pair 12, 18 or 13, 19, respectively.

The balls 6 then connect the inner hub 4 and the outer hub 7 so as to rotate with one another, in order to transfer a torque. At the same time, the cage 5 is guided and centered in the outer hub 7 in the axial direction, by means of the reciprocal cage centering surfaces 22, 23.

Penetration of moisture into the joint can be prevented in that in the case of the embodiment shown in FIG. 1, for example, a sealing ring 38 is provided between the cap 28 and the outer hub 7 or the accommodation part 8.

In FIG. 11 to 19, embodiments of an opposed path joint 1 are shown, whose outer hub 7 is not in one piece, as described with reference to FIGS. 1 to 10, whereby the same components in all embodiments are designated with the same reference numbers.

Figure 11:
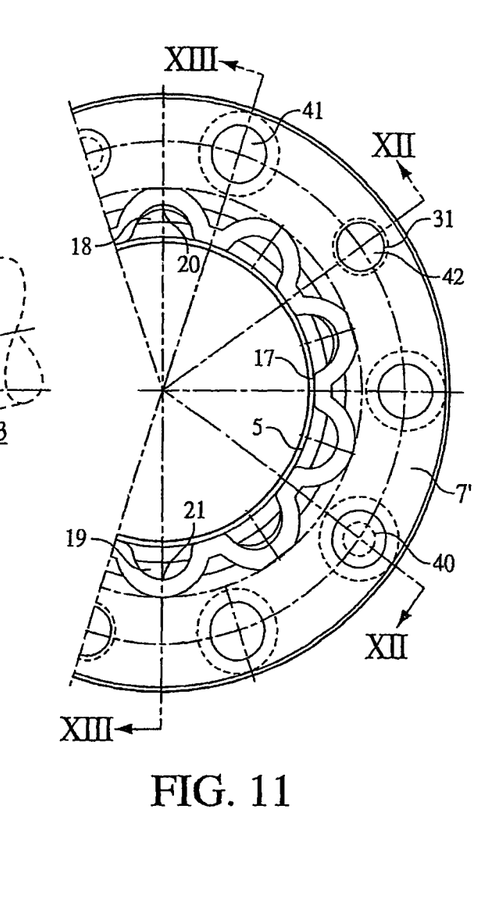
Figure 12:
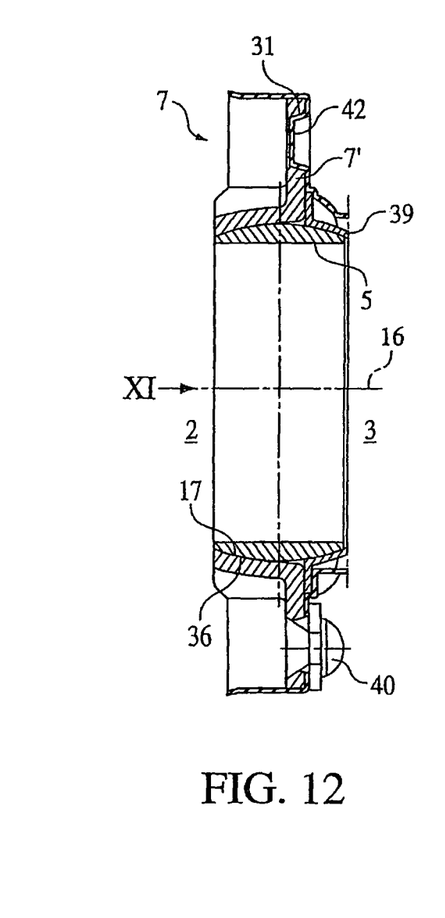
Figure 13:
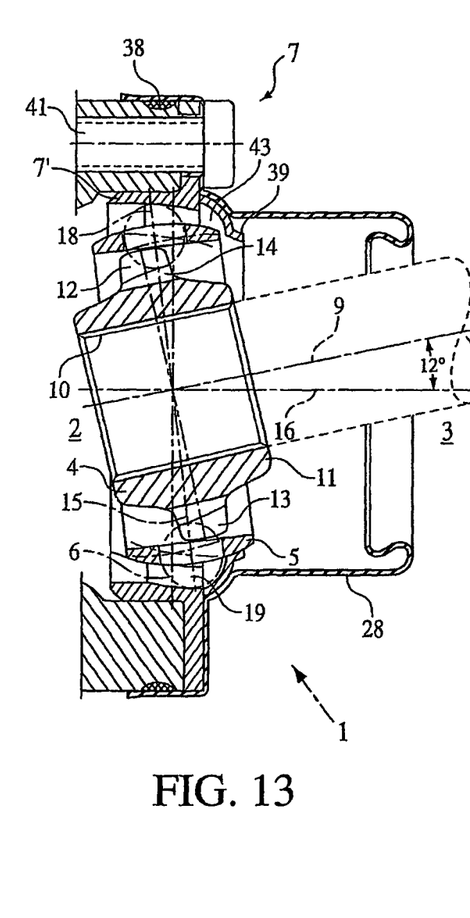

In the case of the opposed path joint 1 according to FIGS. 11 to 13, a drive-side end 2 and a power-take-off-side end 3 is indicated in FIGS. 12 and 13, whereby in this embodiment as well, the designation "drive-side" and "power-take-off-side" was selected merely as an example, to better differentiate the two ends. The opposed path joint 1, as is particularly evident from FIG. 13, has, from the inside to the outside, an inner hub 4, a cage 5 in which balls 6 are guided, and an outer hub 7. A profiled disk 39 is provided, resting on the cage 5 in some regions, and connected with an outer hub part 7', so that the outer hub 7 is formed by the disk 39 and the outer hub part 7'.

The inner hub 4 essentially corresponds to the inner hub described above, with reference to FIGS. 1 and 2, which is a ring-shaped component having a central inner hub axis 9 and a profiled inner surface 10 for a connection with a driving or driven component. The outer surface 11 of the inner hub 4 has several first inner grooves 12 and second inner grooves 13, arranged distributed regularly and alternately on the circumference, and running without an undercut, in each instance.

The outer hub part 7' is a single-piece ring-shaped component having an outer hub axis 16 that coincides with the inner hub axis 9 of the inner hub 4 in the extended position of the opposed path joint 1. The inner surface 17 of the outer hub part 7' has first outer grooves 18 and second outer grooves 19 that are arranged distributed regularly and alternately about the outer hub axis 16. In the finished, assembled state of the opposed path joint 1, first inner grooves 12 of the inner hub 4 lie opposite first outer grooves 18 of the outer hub part 7', and second inner grooves 13 lie opposite the second outer grooves 19, and form a pair with them, in each instance.

The first outer grooves 18 of the outer hub part 7' run, without an undercut, from the drive-side end 2, proceeding in the direction towards the power-take-off-side end 3, whereby their track base 20 comes closer to the outer hub axis 16. The second outer grooves 19 run, without an undercut, from the power-take-off-side end 3, proceeding in the direction towards the drive-side end 2, whereby their track base 21 comes closer to the outer hub axis 16.

In this embodiment, as is evident from FIGS. 12 and 13, the profiled disk 39 is a perforated disk that rests on the outer hub part 7' in some regions. The disk 39 is held on the outer hub part 7' by means of a cap 28, whereby the cap 28 is connected with the outer hub by way of rivets 40 as well as screw connections 41. The cap 28 rests against the disk 39 in some regions, so that the disk 39 is centered by the cap 28. The cap 28 in turn engages in corresponding recesses (passage bores) 31 of the outer hub part 7', with projections 42, in order to center the cap 28 relative to the outer hub part 7'.

Figure 14:
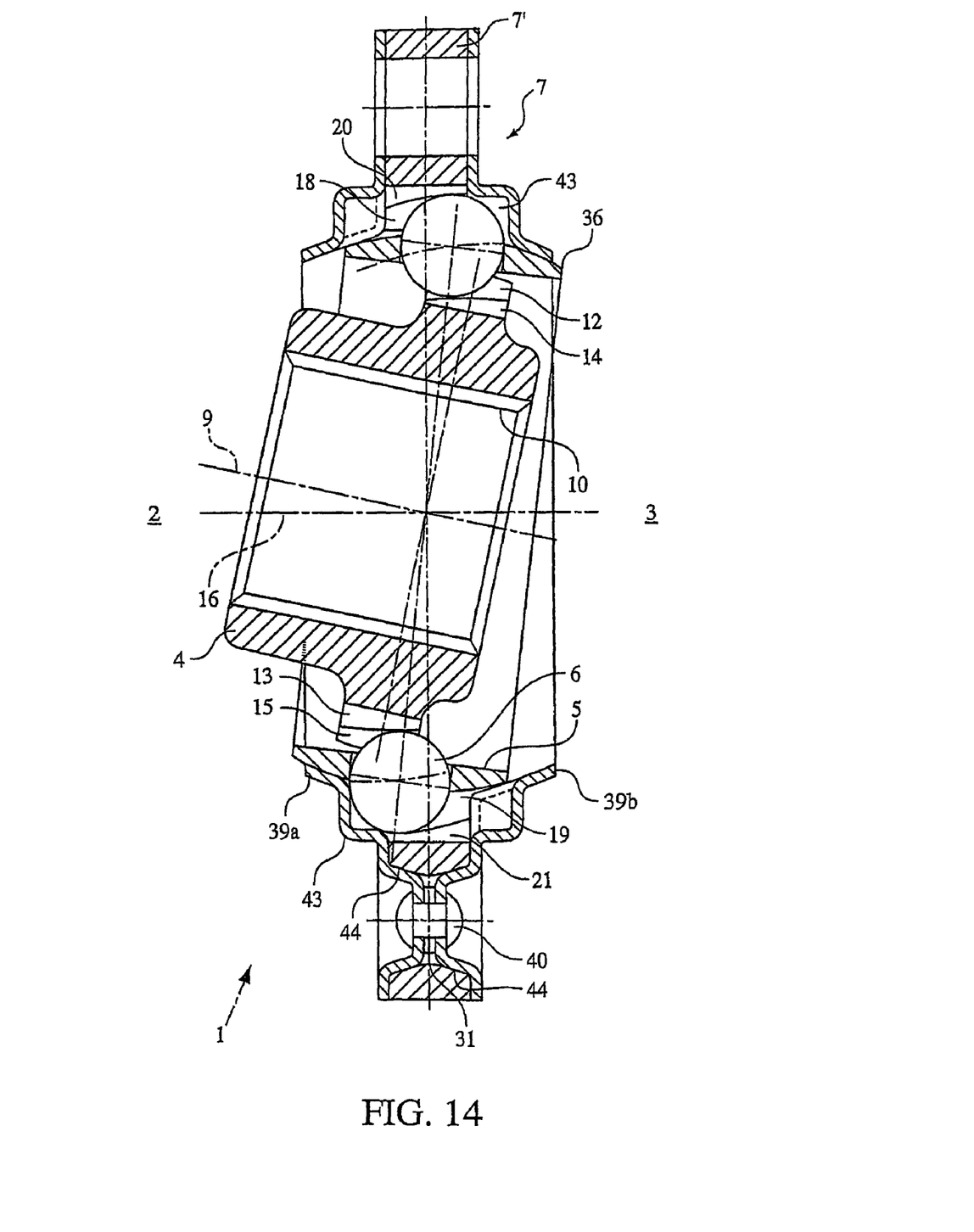

In the embodiment shown, the outer hub part 7' is a profiled sheet-metal part, but it is also possible to configure the outer hub part 7' as a solid, closed ring, as is shown in FIG. 14, for example.

The outer hub part 7' and the profiled disk 39 form cage centering surfaces in the region that lies between the outer grooves, which surfaces reciprocally guide and center the cage 5 in the axial direction. For this purpose, the cage centering surfaces have a shape that is adapted to the outer contour of the cage 5, in some regions, so that the cage 5 is held in the outer hub 7 and can rotate about its axis.

As is best evident from the illustration of FIG. 12, the cage 5 has a spherical outer surface 36, with which it is guided in the radial direction as well as in the axial direction, towards the drive-side end 2 of the opposed path joint 1, in the outer hub part 7'. At the same time, the profiled disk 39 rests on the spherical outer surface 36 of the cage 5, in some regions, in order to guide it in the axial direction at the power-take-off-side end 3 of the opposed path joint 1. In FIG. 13, it is evident that the profiled disk 39 has bulges 43 in the region of the outer grooves 18, 19 of the outer hub part 7', which are connected with the outer grooves. The bulges 43 serve, on the one hand, to accommodate the balls 6 in case of deflection of the opposed path joint 1 and, at the same time, the bulges 43 form a reservoir in which lubricant can be accommodated.

In FIG. 14, another embodiment of an opposed path joint 1 is shown, in which the outer hub part 7' is configured as a solid ring that carries a flange-like outer region. On both sides of the outer hub part 7', profiled disks 39a and 39b are provided, which are configured as perforated disks. The disks 39a, 39b lie on the outer surface 36 of the cage 5, in some regions, and center the latter. In the region of the outer grooves 18, 19, the profiled disks 39a, 39b have bulges 43, while they rest against the outer hub part 7' in the other regions, as shown with a broken line in FIG. 14.

The profiled disks 39a, 39b are provided with set-back contact regions 44, which engage in corresponding recesses 31 of the outer hub part 7'. In these contact regions 44, the profiled disks 39a and 39b are connected with one another by way of rivets 40. The contact regions 44 of the profiled disks 39a, 39b achieve the result that the disks are centered relative to the outer hub part 7', and thereby the cage 5 is also centered relative to the outer hub 7.

Figure 15:
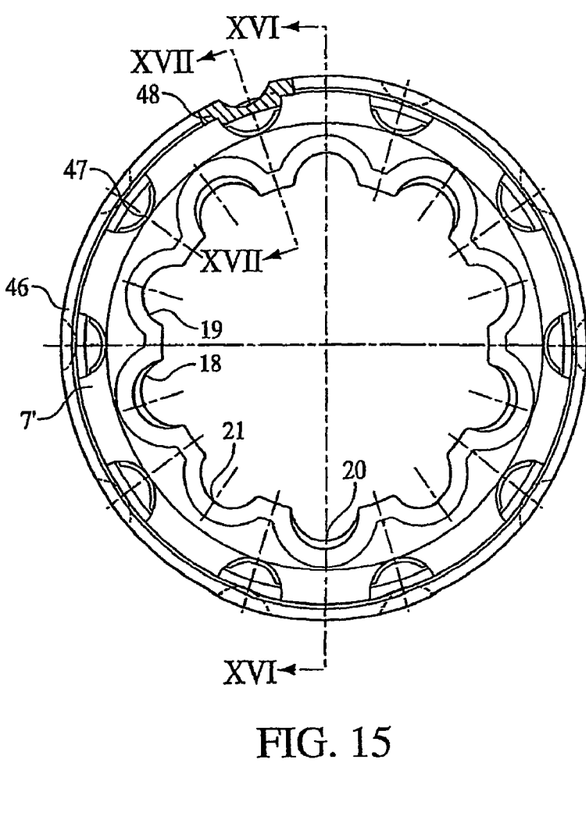
Figure 16:
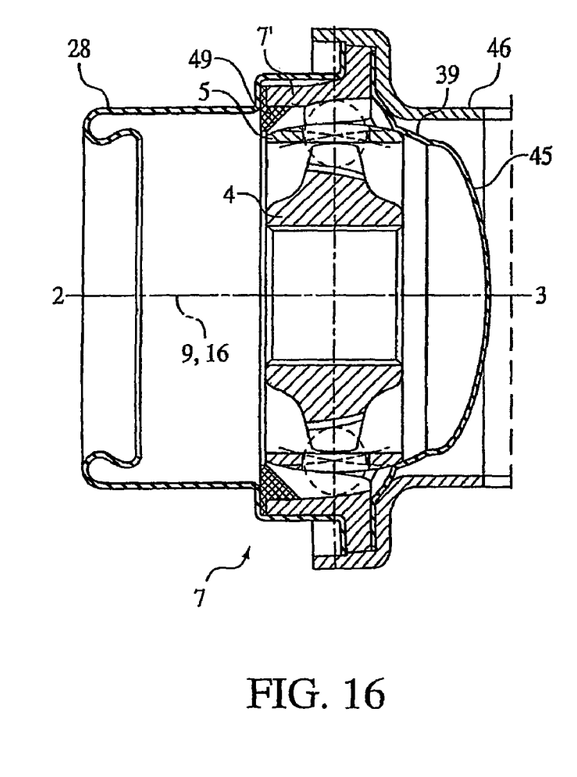
Figure 17:
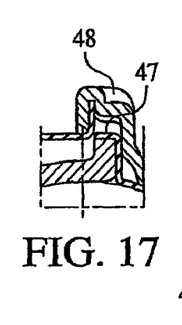

Another embodiment is shown in FIGS. 15 to 17, which represents a modification as compared with the embodiment shown in FIGS. 11 to 13. Here, the outer hub part 7' is configured as a profiled sheet-metal part, on which a cap 28 to attach a folded bellows (not shown) is attached on the drive-side end 2. On the power-take-off-side end 3 of the opposed path joint 1, a profiled disk 39 is provided, resting against the outer hub part 7', which disk is configured as a closed cage guide cover 45. The cage guide cover 45 as well as the outer hub part 7' are surrounded by an accommodation flange 46, in some regions. The cage guide cover 45 is centered relative to the outer hub part 7', in that it engages in recesses 47 on the circumference of the outer hub part 7'. The accommodation flange 46 also engages in these recesses 47, with projections 48, so that it is connected with the outer hub part 7' so as to rotate with it. Furthermore, a sealing ring 49 is shown in FIG. 16, on the drive-side end 2, which seals off the cavity formed by the outer grooves 18, 19, so that lubricant can be accommodated in this cavity, for example.

In the following, assembly of an opposed path joint 1 according to FIGS. 11 to 17 will be explained. First, the cage 5 is set onto the inner hub 4 and brought into the center position by means of an assembly device. In this connection, a ball 6 is inserted into the cage 5, in every other opening, and the cage 5 is introduced into the outer hub 7, on which the profiled disk 39 has not yet been placed, in the embodiments according to FIGS. 11 to 13 and 15 to 17 or, only one of the two profiled disks 39a or 39b has been attached, in the embodiment according to FIG. 14. In this connection, the cage 5 is positioned relative to the inner hub part 7', for insertion into the latter, in such a manner that the balls engage in the outer grooves, the largest openings of which face the cage to be introduced. In other words, the cage with the balls is inserted into outer grooves whose track base is furthest removed from the outer hub 16 on the side of the cage to be inserted.

In order to insert additional balls 6 into the openings of the cage 5, the latter is pivoted relative to the outer hub part 7', with the inner hub 4, so that one of the openings comes out of the outer hub part 7' on the side of the outer grooves, on which side the track base 20 or 21, respectively, of the outer groove 18 or 19, respectively, has its greatest distance from the outer hub axis 16. In other words, an opening of the cage 5 is pivoted out of the outer hub part 7' so far that it comes out of the latter, on the side of the greatest opening of the groove pairs 12, 18 or 13, 19, respectively. Now a ball 6 can be inserted into the opening of the cage 5 that has been pivoted out in this manner. This procedure must be performed individually for every other ball 6, i.e. for every other groove pair 12, 18 and 13, 19.

Finally, the profiled disk 39 is placed against the outer hub part 7', centering the cage 5, and connected with it to form an outer hub 7. The individual balls 6 then connect the inner hub 4 and the outer hub 7 so as to rotate with one another, in order to transfer a torque. Radial forces are transferred from the inner hub 4 to the outer hub 7, by way of the balls 6, and vice versa. In this connection, the cage 5 is centered in the axial direction either by means of the outer hub part 7' and a profiled disk 39, or by two profiled disks 39a, 39b.

Figure 18:
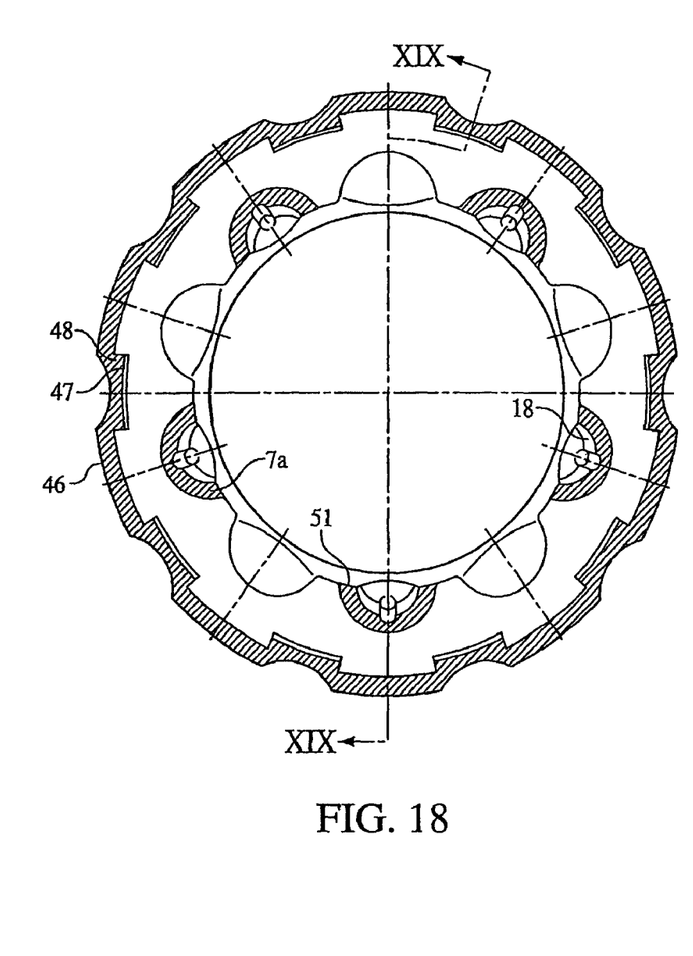
Figure 19:
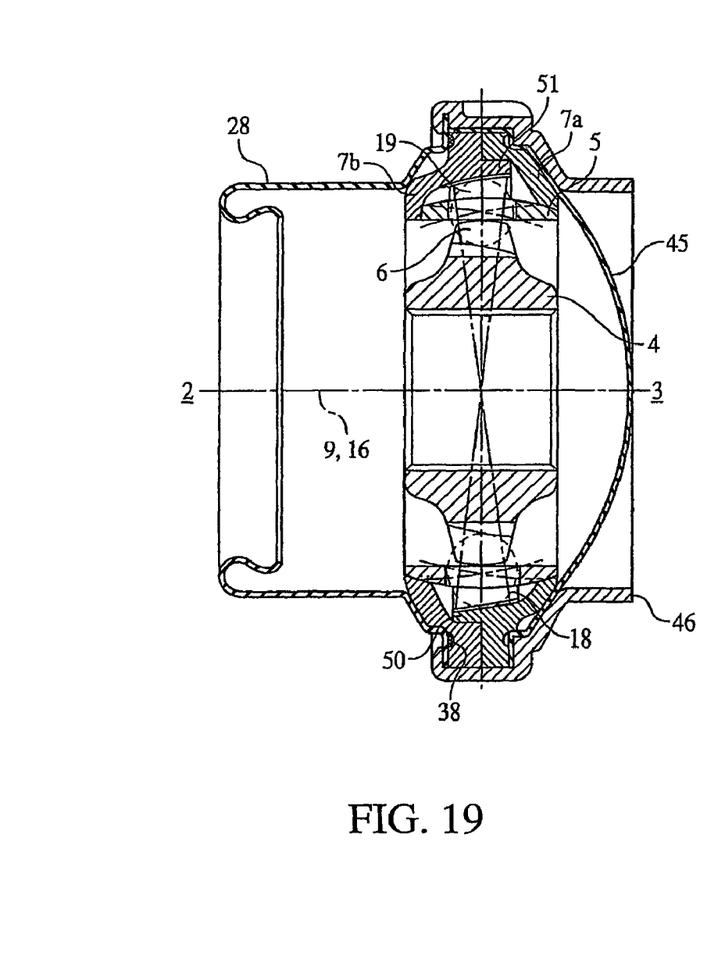

In FIGS. 18 and 19, an embodiment of the opposed path joint is shown, in which the outer hub 7 is in two parts. The outer hub 7 is formed by two rings 7a, 7b, which rest against one another in some regions and engage in one another, in claw-like manner, with projections 50 and 51, respectively.

By means of the projections 50 and 51, the two rings 7a and 7b are connected with one another so as to rotate with one another, and centered relative to one another. In this connection, the first ring 7a with its projections 50 forms the first outer grooves 18, while the second ring 7b with its projections 51 defines the second outer grooves 19. The two rings 7a and 7b are surrounded by an accommodation flange 46 and held together by the latter.

The rings 7a and 7b form cage centering surfaces at their drive-side and power-take-off-side ends, which surfaces correspond to the outer contours of the cage 5 in some regions, and which rest against the cage 5. In this manner, the cage 5 is centered by the two rings 7a and 7b of the outer hub 7 and guided so as to rotate about its axis.

The opposed path joint shown in FIGS. 18 and 19 can be assembled in that the inner hub 4 is inserted into the cage 5 and brought into the centered position by means of an assembly device. All of the balls 6 can be inserted into the cage 5 and into the inner grooves 12 and 13 of the inner hub 4 in this position, through the openings. By way of suitable means, for example grease, the balls 6 are held in the cage 5 in such a manner that they do not fall out of it. It is therefore possible to insert all of the balls 6 into the cage 5, in automated manner, and to connect the latter with the outer hub 7. The two rings 7a and 7b can now be set onto the cage 5 with the balls 6 inserted in it, whereby the ring 7a surrounds the cage 5 from the power-take-off-side end 3, and the ring 7b surrounds the cage from the drive-side end 2. In this connection, the rings 7a and 7b are aligned relative to the inner hub 4 in such a manner that first inner grooves 12 lie opposite first outer grooves 18, and second inner grooves 13 lie opposite first outer grooves 19, so that these form a groove pair, in each instance, in which a ball 6 is accommodated.

Penetration of moisture into the joint can be prevented in that a sealing ring 38 is provided between the cap 28 and the outer hub 7 or a flange, as shown in FIGS. 13 and 19.

REFERENCE SYMBOL LIST 1 opposing path joint
2 drive-side end
3 power-take-off-side end
4 inner hub
5 cage
6 ball
7 outer hub
7' outer hub part
7a,b ring
8 accommodation part
9 inner hub axis
10 inner surface of inner hub 4
11 outer surface of inner hub 4
12 first inner groove
13 second inner groove
14 track base of the first inner groove 12
15 track base of the second inner groove 13
16 outer hub axis
17 inner surface of the outer hub 7
18 first outer groove
19 second outer groove
20 track base of the first outer groove 18
21 track base of the second outer groove 19
22 first cage centering surfaces
23 second cage centering surfaces
26 stress-relief groove
27 projection
28 cap
29 sealing disk
30 connecting flange
31 passage bore (recess)
32 stud
33 connecting bore
34 attachment shackle
35 axis of the cage 5
36 outer surface of the cage 5
37 radial opening
38 sealing ring
39 profiled disk
39a, b profiled disk
40 rivet
41 screw connection
42 projection
43 bulge of disk 39
44 contact region
45 cage guide cover
46 accommodation flange
47 recess
48 projection
49 sealing ring
50 projection
51 projection
$D_K$ outside diameter of the cage 5
$D_A$ inside diameter of the outer hub 7

The invention claimed is:

1. Opposed path joint, which has a drive-side end and a power-take-off-side end, having
    an inner hub that has an inner hub axis and an outer surface, in which first inner grooves and second inner grooves are arranged, alternately distributed about the inner hub axis, whereby the first inner grooves run from the drive-side end, proceeding in the direction towards the power-take-off-side end, and their track base moves away from the inner hub axis, and whereby the second inner grooves run from the power-take-off-side end, proceeding in the direction towards the drive-side end, and their track base moves away from the inner hub axis,
    an outer hub that has an outer hub axis and an inner surface in which first outer grooves and second outer grooves are arranged, alternately distributed about the outer hub axis, and the first inner grooves, in each instance, lie opposite first outer grooves, and the second inner grooves lie opposite second outer grooves, and form a pair with them, in each instance, whereby the first outer grooves run from the drive-side end, proceeding in the direction towards the power-take-off-side end, and their track base comes closer to the outer hub axis, and whereby the second outer grooves run from the power-take-off-side end, proceeding in the direction towards the drive-side end, and their track base comes closer to the outer hub axis, in this connection,
    a ring-shaped cage, which is arranged between the inner hub and the outer hub and has radial openings corresponding to the number of pairs of grooves, in which balls that engage in the grooves are guided,
    wherein the outer hub comprises at least first and second elements that are connected with one another, which lie behind one another on the outer hub axis and jointly center the cage; and
    wherein the first and second elements engage in one another, the first element having the first outer grooves and the second element having the second outer grooves.

2. Opposed path joint according to claim 1, wherein the first and second elements comprise first and second solid rings that are connected with one another.

3. Opposed path joint according to claim 1, wherein a profiled disk is provided on at least one end of an outer hub part, which disk rests on the outer cage surface, centering the cage, in certain regions.

4. Opposed path joint according to claim 3, wherein profiled disks are provided both at the drive-side end and at the power-take-off-side end of the outer hub part, which disks rest on the outer cage surface, centering the cage, in certain regions.

5. Opposed path joint according to claim 4, wherein at least one of the profiled disks forms a closed cage guide cover.

6. Opposed path joint according to claim 4, wherein at least one of the profiled disks is a perforated disk.

7. Opposed path joint according to claim 3, wherein the at least one disk has a contact region with which the at least one disk can be brought into engagement with the outer hub part, in order to position the at least one disk relative to the outer hub part.

8. Opposed path joint according to claim 3, wherein the at least one disk has a contact region with which the at least one disk rests against an accommodation flange attached to the outer hub part, in order to position the at least one disk relative to the outer hub part.

9. Opposed path joint according to claim 8, wherein the accommodation flange is connected with the outer hub part so as to rotate with the outer hub part.

10. Opposed path joint according to claim 3, wherein the at least one disk has bulges that project away from the outer hub part, corresponding to the number of outer grooves, which are in connection with one of the outer grooves, in each instance, forming a cavity.

* * * * *